(12) United States Patent
Ichiyoshi

(10) Patent No.: US 7,002,945 B2
(45) Date of Patent: Feb. 21, 2006

(54) FDM-CDMA TRANSMITTING METHOD, FDM-CDMA RECEIVING METHOD, FDM-CDMA TRANSMITTING DEVICE AND FDM-CDMA RECEIVING DEVICE

(75) Inventor: Osamu Ichiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 896 days.

(21) Appl. No.: 09/851,975

(22) Filed: May 10, 2001

(65) Prior Publication Data
US 2001/0040882 A1 Nov. 15, 2001

(30) Foreign Application Priority Data
May 11, 2000 (JP) ............................. 2000-138181

(51) Int. Cl.
- *H04B 7/216* (2006.01)
- *H04B 1/69* (2006.01)
- *H04B 1/707* (2006.01)
- *H04J 3/06* (2006.01)

(52) U.S. Cl. ...................... 370/342; 370/335; 370/441; 370/503; 375/148; 375/152

(58) Field of Classification Search ........ 370/203–210, 370/320, 321–354, 441–503; 375/121–130, 375/146–152, 200, 205, 265, 346; 455/74, 455/76, 550–562
See application file for complete search history.

(56) References Cited

U.S. PATENT DOCUMENTS

| | | | | |
|---|---|---|---|---|
| 5,469,468 A | * | 11/1995 | Schilling | 375/130 |
| 5,966,377 A | * | 10/1999 | Murai | 370/342 |
| 5,970,084 A | * | 10/1999 | Honda | 375/147 |
| 6,256,508 B1 | * | 7/2001 | Nakagawa et al. | 370/312 |
| 6,373,861 B1 | * | 4/2002 | Lee | 370/503 |
| 6,507,605 B1 | * | 1/2003 | Fukumoto et al. | 375/152 |
| 6,519,238 B1 | * | 2/2003 | Miya et al. | 370/335 |
| 6,782,041 B1 | * | 8/2004 | Aihara | 375/150 |
| 2001/0038664 A1 | * | 11/2001 | Saito et al. | 375/148 |
| 2002/0122465 A1 | * | 9/2002 | Agee et al. | 375/141 |
| 2002/0150070 A1 | * | 10/2002 | Shattil | 370/342 |
| 2002/0159425 A1 | * | 10/2002 | Uesugi et al. | 370/342 |

FOREIGN PATENT DOCUMENTS

JP 6-318926 11/1994

(Continued)

OTHER PUBLICATIONS

Article from the Technical report, titled "Multiplexing Scheme and TMCC Transmission Characteristics in Terrestrial ISDB Systen" vol. 21, No. 30 pp. 1-6, dated May 1997.

(Continued)

*Primary Examiner*—Man U. Phan
(74) *Attorney, Agent, or Firm*—Whitham, Curtis & Christofferson P.C.

(57) ABSTRACT

A spreading code setting circuit generates N vectors, as spreading codes, which are +1 or −1 polarity and are unique to users. A multiplier multiplies the nth data and the nth spreading code corresponding thereto for the spread modulation. An FDM combining circuit modulates N pieces of data according to the FDM method. A FDM separating circuit demodulates received signals according to the FDM method. An inverse spreading code setting circuit generates N vectors, as inverse spreading codes, which are +1 or −1 polarity and are unique to users at the transmission side. A multiplier multiplies the nth data and the nth inverse spreading code corresponding thereto for inverse spread modulation.

12 Claims, 5 Drawing Sheets

FOREIGN PATENT DOCUMENTS

JP 7-283801 10/1995
JP 11-317712 11/1999

OTHER PUBLICATIONS

From the IEICE article titled "An OFDM-CDMA System using Combination of Time and Frequency Domain Spreading" vol. 100, No. 21.

Japanese Office Action dated Jun. 3, 2003 with English translation of pertinent portions.

European Search report dated Jun. 25, 2004.

XP010209137 Rasmussen et al. "A Unifying Discrete-Time Model for Direct Sequence and Multicarrier Variable Rate Broadband CDMA" Personal, indoor Radio Communications, 1996; ppg. 1111-1115.

XP-000912513 Kim et al. "A Multicarrier CDMA System with Adaptive Subchannel Allocation for forward Links"IEEE Transactions on Vehicular Technology, vol. 48 No. 5 Sep. 1999; ppg. 1428-1436.

XP-010353407 Shan Tsung Wu et al. "Orthogonal Frequency CDMA for Broadband Communications" Vehicular Technology Conference, 1999 ; ppg. 2890-2894.

* cited by examiner

FDM-CDMA TRANSMITTING METHOD, FDM-CDMA RECEIVING METHOD, FDM-CDMA TRANSMITTING DEVICE AND FDM-CDMA RECEIVING DEVICE

BACKGROUND OF THE INVENTION

The present invention relates to the radio broadcasting and the radio communication technologies, more particularly to an FDM-CDMA transmission method, an FDM-CDMA receiving method, an FDM-CDMA transmitting device, and an FDM-CDMA receiving device, which can integrate the FDM-method broadcasting and the CDMA-method communication.

In long distance radio broadcasting and mobile communication, call quality is extremely unstable due to the multiple propagation in propagation paths. Recently, in mainstream radio and/or wireless telephones are the main stream, sufficient quality has been obtained by frequency modulation (FM) and/or the amplitude modulation (AM). However, the recent data communication typified by the radio and the Internet suffers from extremely serious problems due to the multiple propagation.

Today, two modulation methods are adopted mainly in order to address fading due to the multiple propagation. One modulation method is a code division multiple access (called "CDMA" below) method. The other modulation method is the orthogonal frequency division multiplex (called "OFDM" below) method.

FIG. 1 is a block diagram showing a configuration of a conventional CDMA communication device. FIG. 1A is a block diagram showing a configuration of a CDMA transmitting device. FIG. 1B is a block diagram showing a configuration of a CDMA receiving device. A modulation circuit 1 of the transmitting device performs orthogonal modulation such as quadrature phase shift keying (QPSK) on input digital data in the baseband frequency band. A transmission timing generating circuit 2 generates a transmission timing clock. A PN coding generating circuit 3 generates a pseudonoise signal (PN code), which is synchronized with the sending timing clock. Here, a sufficiently broad band, that is, a rapid PN signal, is used for the bandwidth of the data modulation. A multiplier 4 multiplies digital data output from the modulation circuit 1 by a PN code so that the digital data undergoes spread modulation. A transmitting portion 5 converts a CDMA signal in the baseband frequency band, which is output from the multiplier 4, to a signal in the radio frequency band for radio transmission.

On the other hand, a receiving portion 6 of the receiving device receives and converts a CDMA signal in the radio frequency band to a signal in the baseband frequency band. A timing error detecting circuit 7 performs relative detection of digital data output from the receiving portion 6 and a PN code output from a PN code generating circuit 9 (relative detection), which is described later. As a result of the relative detection, an error in the receiving timing clock is detected. A receiving timing clock corresponding to the detected error is generated from a receiving timing reproducing circuit 8. A PN code is generated from a PN code generating circuit 9, and is synchronized with the received timing clock. A multiplier 10 multiplies the digital data output from the receiving portion 6 by the PN code in order to perform the inverse spread modulation on the digital data. A demodulating circuit 11 performs the orthogonal demodulation such as QPSK on the data output from the multiplier 10.

As described above, the CDMA method is a method for multiplying a normal data modulation signal by a PN code generated rapidly by an unique code assigned to each subscriber In order to further perform the spread spectrum modulation on the normal data modulation signal for transmission. The multiplexing is performed by assigning different codes to different subscribers. Thus, this type of multiplexing is called code division multiplexing. In the CDMA method, the ratio of the information data rate and the spreading code speed (chip speed) is called a spread ratio or a processing gain. Since all of the modulated sending signals occupy a bandwidth corresponding to the chip speed, the frequency bands overlap with each other.

However, when relative-detection is performed by using a PN code of a signal to be received in the receiving device, the electric power of an intended signal becomes larger than other signals in proportion to the squares of the spread ratio while the electric power of the other interference signals becomes larger in proportion to the spread ratio. Therefore, as a result, the S/N ratio is improved in proportion to the spread ratio. This is the reason why the spread ratio is also called processing gain. The CDMA method uses all of the frequency bands for spread modulation. Thus, even if some of the frequency bands are not transmitted due to the multiplex propagation distortion, signals can be transmitted through another band. Therefore, the CDMA method can be used for mobile communication.

On the other hand, the OFDM method is a method for dividing into narrow band frequency channels where the distribution of delays in multiple propagation paths is small enough to performing communication. When the data rate is as large as that of the radio broadcasting, many narrow band channels must be used. Since different frequency channels are not related to each other, that is, they are orthogonal, it is called orthogonal frequency division multiplex. In the OFDM method, frequency division multiplex (FDM) with many narrow bands can be generated easily by the digital signal processing using fast Fourier transforms.

The reason why the OFDM method is used in the mobile broadcasting is that it permits the proper data transmission by using an error correction code as a whole since the other channels are transmitted properly even when some frequency channels are not transmitted due to the transmission path distortion caused by the multiple propagation. This OFDM method is used in the Japanese and European digital broadcasting systems.

Radio communication has an advantage that it can cover a significant amount of the earth's surface all at once compared to wired communication. For example, satellite communication can provide a communication network to a vast area, substantially equal to ⅓ of the earth surface, all at once, by using a single satellite. Satellite communication is particularly suitable for broadcasting and is currently used commercially as direct satellite broadcasting. Application technologies making good use of the advantages of radio are being applied in the fields of broadcasting and mobile communications. The recent evolution of digital mobile communication has been remarkable, and the data communication for telephones and the Internet, as seen in the "i-mode" system of NTT Docomo, has been widely accepted.

The next generation mobile communication system called "IMT-2000" adopts the CDMA method. On the other hands businesses which provide portable or terminal devices moving fast with high quality digital audio broadcasting (called "DAB" below) through a ground relay network or a satellite are emerging. "DAB" adopts the OFDM method. Moreover, the Japanese and European digital broadcasting systems adopt the OFDM method, as described above.

Currently, the mobile communication terminal is a tool used for many purposes as an Internet terminal, and so on. With the spread of mobile communication, a need for receiving DAB from satellites by using the same mobile communication terminal has arisen. However, since the current communication and broadcasting systems adopt completely different communication methods, the integration of communication and broadcasting is extremely difficult.

Furthermore, since the CDMA receiving device must perform relative detection of many chips in an extremely fast manner in the conventional CDMA method, the synchronization of PN codes requires a significant amount of time for inverse spread modulation at the time of the receipt in particular. In a system the cell switching is performed frequently such as in a mobile communication, the long time required for synchronization could be a big problem.

SUMMARY OF THE INVENTION

A first object of the present invention is to realize an FDM-CDMA transmission method, an FDM-CDMA receiving method, an FDM-CDMA transmitting device, and an FDM-CDMA receiving device, which can combine FDM-method broadcasting and CDMA-method communication.

Further, a second object of the present invention is to realize an FDM-CDMA transmission method, an FDM-CDMA receiving method, an FDM-CDMA transmitting device, and an FDM-CDMA receiving device, which can perform inverse spread modulation easily and instantly at the time of reception.

An FDM-CDMA transmission method according to one aspect of the present invention includes the steps of assigning N (N is an integer of 1 or more) pieces of digital data to N frequency channels for modulation and transmission using the frequency and division multiplex (FDM) method and performing spread modulation on N pieces of digital data by the code division multiple access (CDMA) method before the modulation. Thus, the spread modulation is performed on the N pieces of digital data according to the CDMA method before the FDM modulation so that broadcasting in the FDM or OFDM method and communication in the CDMA method can be combined.

Further, the FDM-CDMA transmission method may generate N vectors, as spreading codes, which are +1 or −1 polarity and are unique to users and may multiply the nth (n is an integer of 1 to N) digital data and the nth vector corresponding thereto, so that the spread modulation is performed on the N pieces of digital data. Thus, the spread modulation can be performed by the multiplication in the time-fixed manner.

Further, in the FDM-CDMA transmission method, the N frequency channels may be divided into a plurality of groups and independent digital data may be assigned to each of the groups. Thus, the channel capacity will be increased, and this results in an increase in the data transmission speed.

Furthermore, in the FDM-CDMA transmission method, the spread modulation may be performed only on the frequency channel adopting the FDM-CDMA method when FDM-method broadcasting and FDM-CDMA method communication are used together for transmission.

An FDM-CDMA receiving method according to another aspect of the present invention in which N (N is an integer of 1 or above) pieces of digital data are assigned to N frequency channels and are modulated and transmitted by the frequency division multiplex (FDM) method, includes the steps of, when signals are received in which spread modulation according to the code division multiple access (CDMA) method has been performed on N pieces of digital data before the modulation, performing demodulation according to the FDM method on the received signals and performing inverse spread modulation according to the CDMA method on N pieces of digital data after modulation. Thus, the inverse spread modulation is performed according to the CDMA method on N pieces of digital data after FDM demodulation, so that broadcasting using the FDM or OFDM method and communication using the CDMA method can be combined The FDM-CDMA receiving method may further include the steps of generating N vectors, as inverse spreading codes, which are +1 or −1 polarity and are unique to users at a transmission side and multiplying the nth (n is an integer of 1 to N) digital data before the demodulation and nth vector corresponding thereto In this case, the inverse spread modulation may be performed thereby on the N pieces of digital data after the demodulation. Thus, the inverse spread modulation can be performed easily in a time-fixed manner.

Further, the FDM-CDMA receiving method may include the steps of, when signals are received in which the N frequency channels are divided into a plurality of groups and independent digital data are assigned to each of the groups, selecting and adding, for each group, only frequency channels belonging to the same group after the inverse spread modulation. Thus, the digital data can be extracted for each group.

Further, the FDM-CDMA receiving method may include the step of performing the inverse spread modulation on the frequency channel adopting the FDM-CDMA method when FDM-method broadcasting and FDM-CDMA-method communication are used together for reception.

An FDM-CDMA transmitting device according to another aspect of the present invention includes a frequency division multiplex (FDM) circuit for assigning N (N is an integer of 1 or above) pieces of digital data to N frequency channels for modulation according to the FDM method, a spreading code setting circuit for generating N spreading codes unique to users, and a multiplier for multiplying the nth (n is an integer from 1 to N) before the modulation and the nth spreading code corresponding thereto for outputting the digital data after the multiplication to an FDM combining circuit.

In the FDM-CDMA transmitting device, the spreading code setting circuit preferably generates N vectors, as spreading codes, which are either +1 or −1 polarity.

The FDM-CDMA transmitting device further includes a signal dividing circuit for dividing the N frequency channels into a plurality of groups and for assigning independent digital data to each of the groups.

Preferably, in the FDM-CDMA transmitting device, the spreading code setting circuit only generates the spreading codes corresponding to the frequency channels used in the FDM-CDMA method when FDM-method broadcasting and the FDM-CDMA-method communication are used together for transmission.

An FDM-CDMA receiving device according to another aspect of the present invention in which N (N is an integer of 1 or above) pieces of digital data are assigned to N frequency channels and are modulated and transmitted according to the frequency division multiplex (FDM) method, includes a frequency division multiplex (FDM) separating circuit for receiving signals on which spread modulation according to the code division multiple access (CDMA) method when signals are received in which the N frequency channels are divided into a plurality of groups and independent digital data are assigned to each of the groups on N pieces of digital data before the modulation, then performing demodulation according to the FDM method on the received signals, and outputting N pieces of digital data after the demodulation, an inverse spreading code setting circuit for generating N inverse spreading codes inherent to users at a transmission side, and a multiplier for multiplying the nth (n is an integer from 1 to N) digital data after the demodulation and the nth inverse spreading code corresponding thereto.

Further, in the FDM-CDMA receiving device, the inverse spreading code setting circuit may generate N vectors, as inverse spreading codes, which are +1 or −1 polarity and are unique to users at the transmission side.

The FDM-CDMA receiving device may further include a selecting/adding circuit for selecting and adding, for each group, only frequency channels belonging to the same group after the inverse spread modulation when signals are received in which the N frequency channels are divided into a plurality of groups and independent digital data is assigned to each of the groups.

Preferably, in the FDM-CDMA receiving device, the inverse spreading code setting circuit only generates the inverse spreading codes corresponding to the frequency channels used in the FDM-CDMA method when FDM-method broadcasting and FDM-CDMA-method communication are used together for reception.

DESCRIPTION OF THE PREFERRED EMBODIMENTS

Figure 1A:
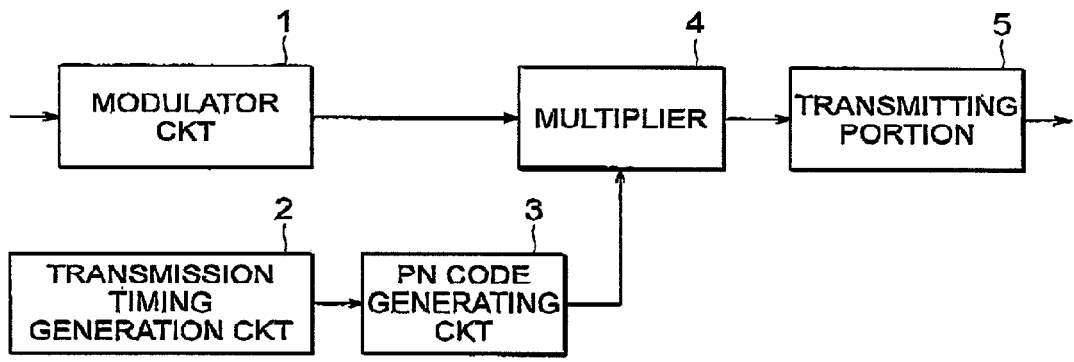
FIGS. 1A and 1B are block diagrams showing the configuration of conventional CDMA communication devices.
Figure 1B:
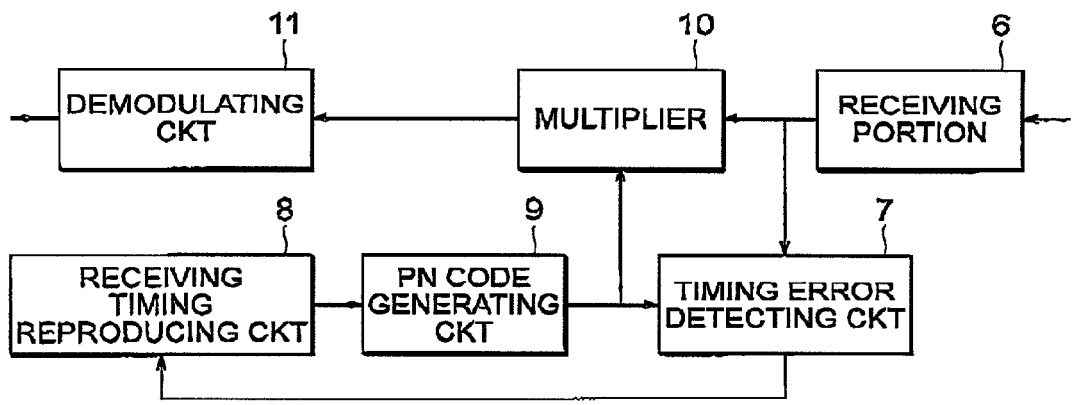
Figure 2A:
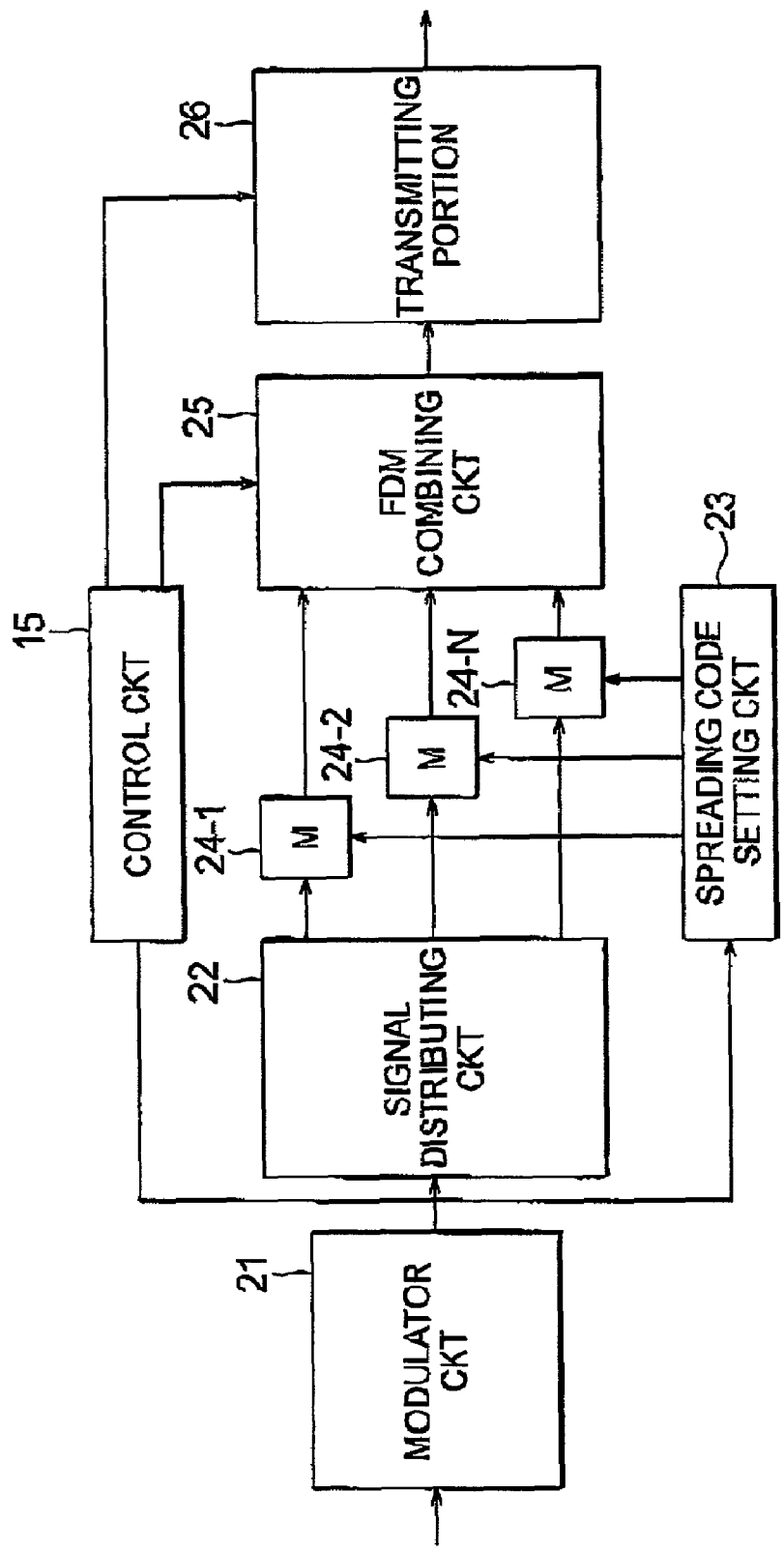
FIGS. 2A and 2B are block diagrams showing the configuration of FDM-CDMA communication devices, which are embodiments of the present invention.
Figure 2B:
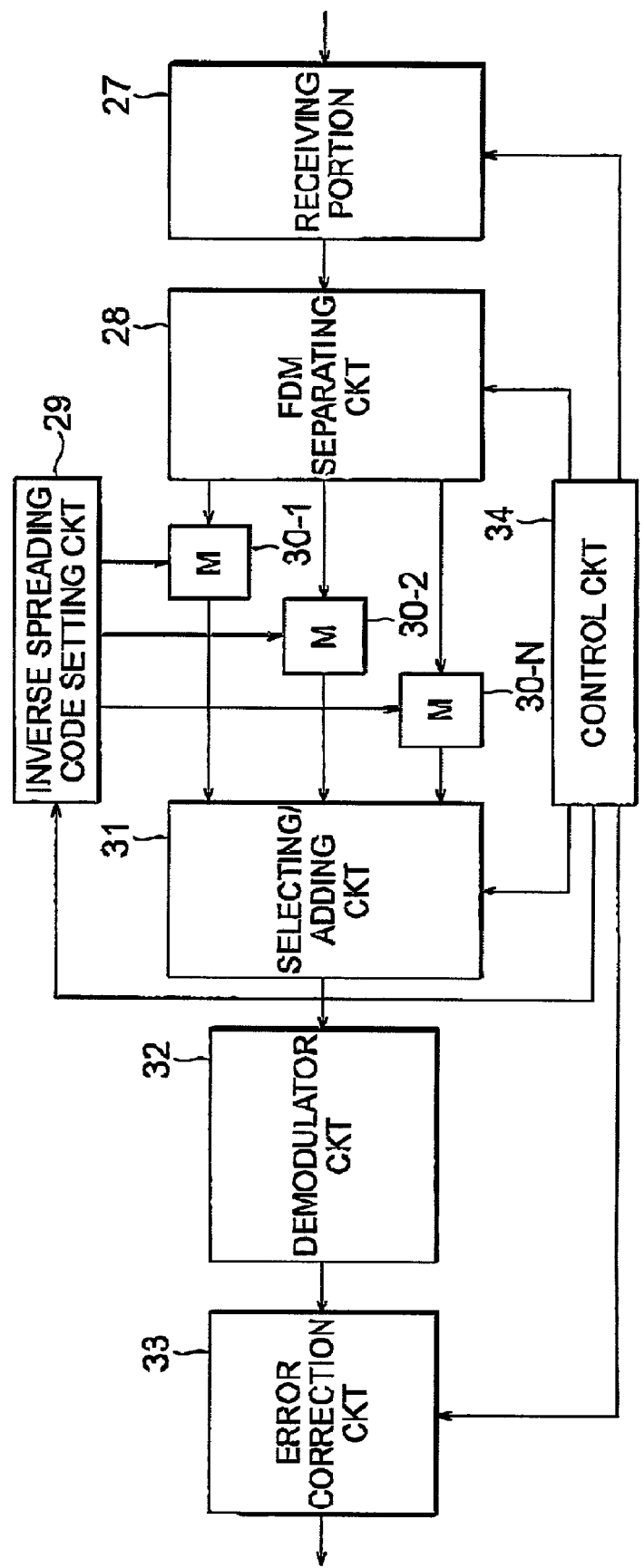

Embodiments of the present invention will be described below in detail with reference to the drawings. FIGS. 2A and 2B are a block diagram showing a configuration of an FDM-CDMA communication device, which is an embodiment of the present invention. FIG. 2A is a block diagram of an FDM-CDMA transmission device, and FIG. 2B is a block diagram of an FDM-CDMA receiving device.

The FDM-CDMA transmission device shown in FIG. 2A comprises a modulator circuit 21 for performing primary modulation on digital data to be transmitted, a signal distributing circuit 22 for distributing the digital data to the number of frequency channels equal to the number N in the FDM method in order to assign the digital data to each frequency channel, a spreading code setting circuit 23 for generating spreading codes in the CDMA method, multipliers 24-1 to 24-N for multiplying the digital data output from the signal distributing circuit 22 by a spreading code in order to perform spread modulation on digital data, an FDM combining circuit 25 for performing the FDM modulation on N pieces of digital data, a transmitting portion 26 for converting signals in the baseband frequency band output from the FDM combining circuit 25 to signals in the radio frequency band for radio transmission, and a control circuit 15 for controlling the entire transmitting device.

As shown in FIG. 2B, the FDM-CDMA receiving device has a receiving portion 27 for receiving and converting signals in the radio frequency band to signals in the baseband frequency band, an FDM separating circuit 28 for performing the FDM modulation on the received signals, an inverse spreading code setting circuit 29 for generating inverse spreading codes, which are compliant with the sending side, multipliers 30-1 to 30-N for multiplying digital data output from the FDM separating circuit 8 by the inverse spreading codes in order to perform the inverse spread modulation on the digital data, an selecting/adding circuit 31 for selecting and adding data output from the multipliers 30-1 to 30-N, a demodulator circuit 32 for performing primary demodulation, which is inverse of the modulator circuit 21, an error correction circuit 33 for using error correction codes contained in the demodulated digital data in order to perform the error correction for the FDM (OFDM), and a control circuit 34 for controlling the entire receiving device.

The present invention performs the spread spectrum based on FDM as shown in FIG. 2. One object of the present invention is to allow the extremely rapid inverse spread in the receiving device. Another object of the present invention is to efficiently encode a variety of material such as, not only voices, but also photographs, pictures, moving pictures, and computer software by using the latest signal processing technologies for use in multi-media businesses including the communication industry as well as the broadcasting industry.

The worldwide standardization of information source coding such as the ITU-T Moving Picture Experts Group (MPEG) specification is advancing. However, specifications for radio transmission methods differ depending on each country. Further, specifications differ between data communication and broadcasting. According to the present invention, as described below, the radio transmission methods used for current broadcasting and communication are combined so that various applications can be achieved for the communication and the broadcasting, audio transmission and image transmission, and so on.

The operation of one embodiment of the FDM-CDMA communication device according to the present invention will be described below. First of all, an operation of the sending side (the FDM-CDMA transmitting device) shown in FIG. 2A will be described.

The modulator circuit 21 performs orthogonal modulation such as Quadrature Phase Shift Keying (QPSK) on two series of input digital data of the in-phase (I) axis component and the quadrature phase (Q) axis component in the baseband frequency band. The orthogonally modulated data is symbol data which has the I-axis component and the Q-axis component. Further, the orthogonally modulated data is complex data which has a real part (the I-axis component, for example) and an imaginary part (the Q-axis component, for example).

The signal distributing circuit 22 performs the serial to parallel conversion on the modulated data output from the modulator circuit 1 in order to output N parallel data divided equally into a number equal to the number of frequency channels N in the FDM method Generally, the number of channels N is several hundred to several thousand. For example, in mobile broadcasting systems using a satellite, it is suitable for suppressing undesirable effects due to multiple propagation delay distribution caused by the motion of a car, for example, to the transmission speed in the order of the bandwidth 1 kHz. However, the transmission of 1 Mbps for moving pictures requires the number of channels N of 1000, and the transmission of 125 kbps high quality voices requires the number of channels N of 125. In this case, according to the present invention, the number of the frequency channels N is the same as the spread ratio of the CDMA method.

The spreading code setting circuit 23 outputs, as spreading codes of the CDMA modulation, N vectors assigned to the communication users, which are +1 or −1 polarity.

The nth (n=1, 2, . . . , N) multiplier 24-n is provided corresponding to the nth channel among the 1 to N frequency channels.

That is, the multiplier 24-n multiplies the nth complex data output from the signal distributing circuit 22 and the nth vector output from the spreading code setting circuit 23, which corresponds to the nth complex data, in order to perform spread modulation on the complex data. Each way values of the N-way vectors output from the spreading code setting circuit 23 can only be either +1 or −1 polarity. Thus, the multiplying operation in the multiplier 24 is simple.

Then, the FDM combining circuit 25 performs the inverse fast Fourier transform (called "IFFT" below) on each of the N spreadingly modulated complex data. Thus, each of the N complex data Is FDM-modulated and converted from signals in the frequency domain to signals in the time domain. The FDM combining circuit 25 performs parallel to serial conversion on N pieces of data and outputs FDM signals in the baseband frequency band.

Figure 3:
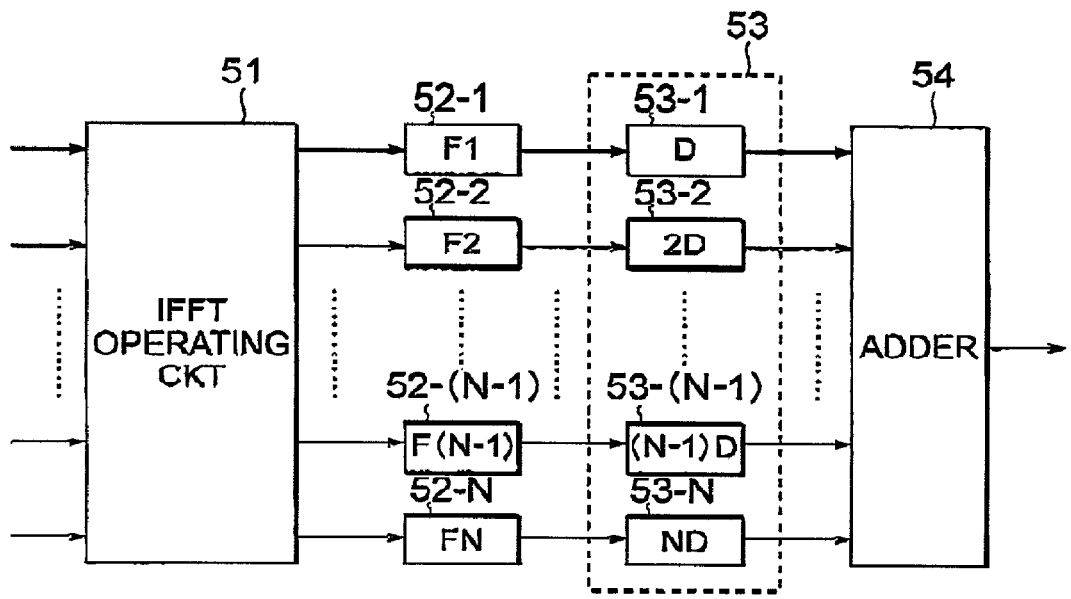
FIG. 3 is a block diagram showing the configuration of an FDM combining circuit within an FDM-CDMA transmitting device in FIG. 2.

FIG. 3 is a block diagram showing the configuration of the FDM combining circuit 25. The FDM combining circuit 25 has an IFFT operating circuit 51, digital filters 52-1 to 52-N, a delay circuit network 53, and an adder 54. The FDM combining circuit 25 operates as a trans-multiplexer (TMUX).

The IFFT operating circuit 51 performs an IFFT operation on each of the N spreading modulated complex data output from the multipliers 24-1 to 24-N. As a result of the operation processing, the FDM modulation is performed on each of the N pieces of complex data.

The digital filters 52-1 to 52-N are band pass filters whose pass bandwidths are identical and whose center frequencies are specified intervals apart. The digital filters 52-1 to 52-N extract frequency components of corresponding channels among the 1 to N frequency channels.

A unit delay amount D of the delay circuit network 53 (53-1 to 53-N) is a delay amount which is determined as the reciprocal of a whole bandwidth of the FDM modulation. The delay circuit network 53 includes N pieces of delay circuits 53-1 to 53-N corresponding to N complex data input to the FDM combining circuit 25 That is, the nth (n=1, 2, . . . , N) delay circuit 53-n is provided by corresponding to the nth channel among the 1 to N frequency channels. The delay amount is set at n×D. Thus, after the FDM modulation, N pieces of data, which are output from the IFFT operating circuit 51 are delayed by delay amounts each of which is equal to an amount in proportion to the output order of the IFFT operating circuit 51.

The adder 54 adds the N pieces of data outputs from the delay circuit network 53 and outputs the added results as FDM signals. That is, the FDM signals are merged to one at the output of the FDM combining circuit 25. In this way, the delay circuit network 53 and the adder 54 operate as a parallel to serial converter. In this case, instead of the adder 54, a switch may be used for sequentially outputting the first to the Nth data output from the delay circuit network 53.

Figure 4:
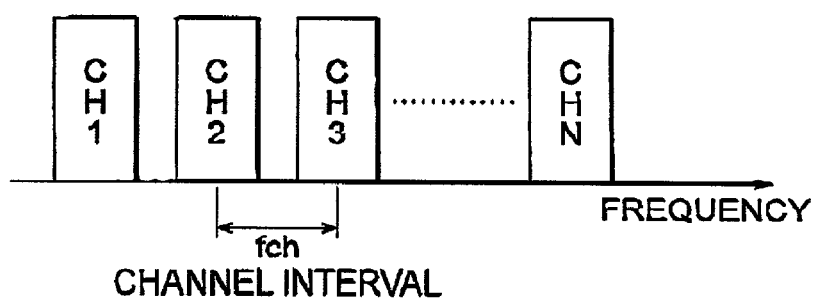
FIG. 4 is a diagram showing a frequency spectrum of an FDM signal output from the FDM combining circuit.

As shown in FIG. 4, the FDM signals are signals for which frequency division multiplexing is performed on N channels located at equal intervals on the frequency axis. As described above, for the transmission speed of the bandwidth 1 kHz, the channel interval fch is 1 kHz.

Finally, the transmitting portion 26 converts the FDM signals in the baseband frequency band which are output from the FDM combining circuit 5 to signals in the radio frequency band for radio transmission.

Next, an operation of the receiving side (FDM-CDMA receiving device) shown in FIG. 2B will be described. The receiving portion 27 receives radio-transmitted signals from the FDM-CDMA transmitting device and converts the signals in the radio frequency band to the FDM signals in the baseband frequency band.

The FDM separating circuit 28 performs the serial to parallel conversion on the FDM signals output from the receiving portion 27 in order to divide them into data of N parallel channels. After that, the FDM separating circuit 28 performs a Fast Fourier Transform (called "FFT" below) on each of N pieces of data for the FDM modulation. Thus, each of N pieces of data is converted from signals in the time domain to signals in the frequency domain.

Figure 5:
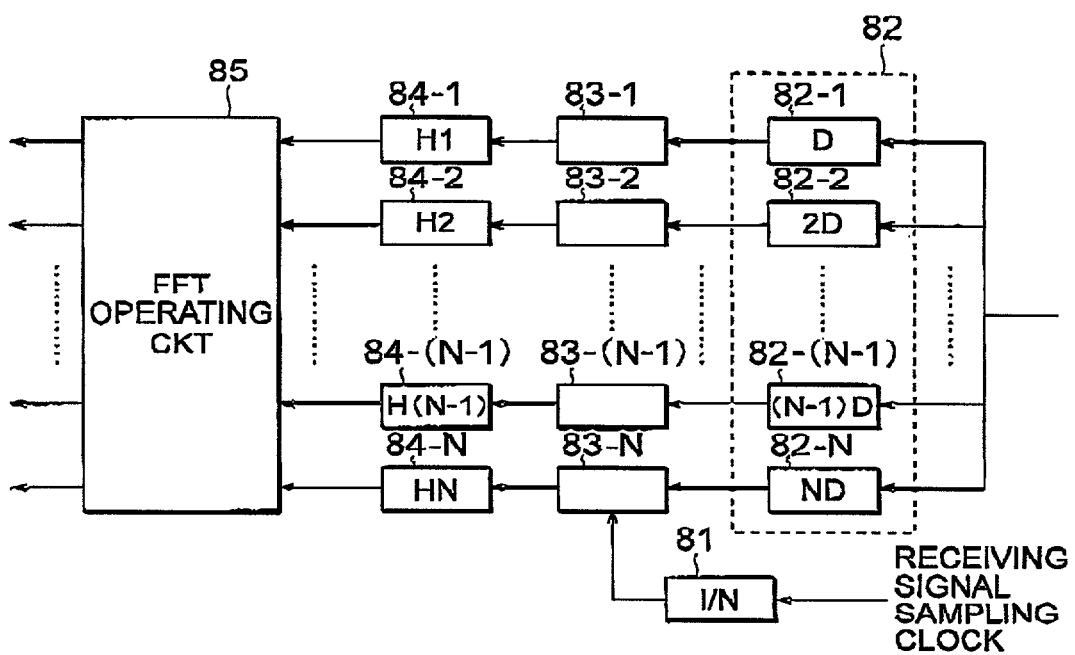
FIG. 5 is a block diagram showing a configuration of an FDM separating circuit within an FDM-CDMA receiving device in FIGS. 2A and 2B.

FIG. 5 is a block diagram showing the configuration of the FDM separating circuit 28. The FDM separating circuit 28 has a 1/N divider 81, a delay circuit network 82, samplers 83-1 to 83-N, digital filters 84-1 to 84-N, and an FFT operation circuit 85.

The 1/N divider 81 performs 1/N division on a received signal sampling clock sent from the sending side and extracted in the receiving portion 27 or a received signal sampling clock read in the receiving portion 27.

A unit delay amount D of the delay circuit network 82 (82-1 to 82-N) is exactly the same as that of the delay circuit network 53. The nth (n=1, 2, . . . , N) delay circuit 82-n is provided by corresponding to the nth channel among 1 to N frequency channels. The delay amount is set at n×D. Thus, the delay amounts each of which is in proportion to the order of the input to the FFT operating circuit 85 are given to N FDM signals input in parallel from the receiving portion 27 to the delay circuits 82 to 82-N.

The nth sampler 83-n is provided by corresponding to the nth channel among 1 to N frequency channels. The nth sampler 83-n samples the FDM signals output from the nth delay circuit 82-n in synchronization with the clock output from the 1/N divider 81. In this way, the 1/N divider 81, the delay circuit network 82, the samplers 83-1 to 83-N operate as the serial to parallel converter.

Like the digital filters 52-1 to 52-N, the digital filters 84-1 to 84-N are band pass filters whose pass bandwidths are identical and whose center frequencies are apart for certain intervals. The digital filters 84-1 to 84-N extract frequency components only of corresponding channels among the 1 to N frequency channels.

The FFT operating circuit 85 performs the FFT operation on each of the N pieces of complex data output from the digital filters 84-1 to 84-N for the FDM demodulation.

Next, the inverse spreading code setting circuit 29 outputs N vectors, which are either +1 or −1 polarity, as inverse spreading codes for the CDMA modulation. Here, the vectors of the inverse spreading codes and the spreading codes having the same corresponding frequency channels are the same. In this case, the N vectors are vectors each assigned to a user at the sending side.

The nth multiplier 30-n corresponds to the nth channel among the 1 to N frequency channels. That is, the multiplier 30-n multiplies the nth complex data output from the FDM separating circuit 28 and the nth complex data output from the inverse spreading code setting circuit 29. Thus, inverse spread modulation is performed on the complex data. Since each of way values of N-way vectors output from the inverse spreading code setting circuit 29 is only either +1 or −1 polarity, the multiplying operation in the multiplier 30 is simple.

Next, the selecting adding circuit 31 selects and adds N complex data output from the multipliers 30-1 to 30-N and performed inverse spread modulation. Thus, the N pieces of complex data undergoes serial to parallel conversion The selecting operation of the selecting/adding circuit 31 will be described below.

The demodulator circuit 32 performs orthogonal demodulation such as QPSK on the complex data output from the adding circuit 31. Thus, the complex data output from the adding circuit 31 becomes two series of digital data, that is, an I-axis component and a Q-axis component. The operations of the error correction circuit 33 and the control circuit 34 will be described below.

Since all of the users share the entire bandwidths in the CDMA method, signal discrimination of each user is performed by using the orthogonal characteristic of the inherent spreading code assigned to each users. In the conventional CDMA method, the spread modulation is performed on signals from each of the users through a fast pseudonoise signal (PN code) which is an inherent spreading code. In the receiving portion, spreading codes of the channels to be received are generated in order to perform relative detection thereon with respect to the received signals for the channel selection.

The FDM-CDMA transmitting device according to the present invention is completely different from that in the conventional CDMA method In the FDM-CDMA transmitting device according to the present invention, the spread spectrum modulation is implemented by performing the multiplication of each output of the signal distributing circuit 22 and each way of N-way vectors output from the spreading code setting circuit 23. The N-way vectors output from the spreading code setting circuit 23 are codes fixed in time. Therefore, the spread modulation according to the present invention is implemented through multiplication fixed in time.

The operation of the FDM-CDMA receiving device according to the present invention is performed by inverting the direction of signals from the above-described transmitting device. In this FDM-CDMA receiving device, like the above-described transmitting device, the inverse spread modulation is performed through the multiplication fixed in time. Therefore, the synchronization with the inverse spreading codes, which is difficult in the conventional CDMA method, can be achieved in an extremely natural and quick manner.

Another characteristic of the present invention is that the various data rates can be used. For example, separate signals are transmitted in the nth (n is even) frequency channel and the nth (n is odd) frequency channel, respectively, so that, the transmitted amount can be double and data transmission which is affected by the multiple propagation can be realized.

When all of the 1 to N frequency channels are used to transmit one kind of signal, the control circuit 34 for the transmitting device controls the selecting/adding circuit 31 so as to select all frequency channels in accordance with a user setting. The selecting/adding circuit 31 selects and adds all of the frequency channels output from the multipliers 30-1 to 30-N under the control of the control circuit 34.

First of all, the 1 to N frequency channels are divided into a plurality of groups When each group is independent, and different signals are transmitted in the FDM-CDMA method, the selecting/adding circuit 31 selects and adds only channels belonging to the same group under the control of the control circuit 34. This is performed for every group. For example, as described above, when the 1 to N frequency channels are divided into even numbered channels and odd numbered channels, the selecting/adding circuit 31 selects and adds even numbered channels first. Next, the selecting/adding circuit 31 selects and adds the odd numbered channels separately. When N frequency channels are divided Into M groups, the spread ratio of each group is N/M and the processing gain is 1/M. Since the channel capacity is M times higher, the data transmission speed will be M times higher.

Similarly, when the number of channels belonging to the same group increases, the data rate can easily be increased. However, as long as the number of channels N is the same, the spread ratio will become smaller as the data rate is increased. Thus, the signal separation performance between different users will be reduced, which results in the reduction of the number of users who can simultaneously transmits. In other words, the multiplex ratio will be reduced In this case, if different frequency channels are assigned to different users by the FDM method, the interference is suppressed mutually, and this allows fast communication The extreme example is the broadcasting. A broadcasting station occupies all channels for the rapid data transmission, so that moving pictures and high quality voice broadcasting can be achieved.

Another characteristic of the present invention is that it allows the use of broadcasting or rapid data transmission adopting the FDM method and communication through the FDM-CDMA method of the present invention together This is because the signal power of each frequency channel is 1/N in the FDM-CDMA method of the preset invention. Therefore, the interference on signals of users occupying and using the channel in the FDM method is small.

On the other hand, in the FDM-CDMA receiving device, electric power spread over a plurality of channels is added in the selecting/adding circuit 11, the S/N ratio of the signals can be improved to several times that of channels used in the FDM-CDMA method.

Further, when different frequency channels are used between the FDM method and the FDM-CDMA method, the mutual interference can be suppressed sufficiently. In this way, the present invention can use radio resources in an extremely flexible and effective manner.

When broadcasting in the FDM method and communication in the FDM-CDMA method according to the present invention are used together, the control circuit 15 of the transmitting device controls the spreading code setting circuit 23 depending on the user setting. Thus, only spreading codes (vectors) corresponding to channels used in the FDM-CDMA method are output and undergo spread modulation. That is, the spreading codes are prevented from being output from channels used in broadcasting using the FDM method.

Furthermore, since, in general, the radio frequency bands for broadcasting and for communication are different, the control circuit 15 causes an up-converter (not shown) of the transmitting portion 6 to perform switching of the radio frequency bands. By switching, signals in the baseband frequency band for broadcasting or communication are converted to signals in the desired radio frequency band for transmission.

On the other hand, the control circuit 34 of the receiving device causes a down-converter (not shown) of the receiving portion 27 to perform the switching of the radio frequency bands in accordance with the user setting. As a result of this switching, the signals in the desired radio frequency band for broadcasting or communication are converted to those in the base band frequency band. In this case, the same radio frequency band can be used for the broadcasting and by the communication.

Furthermore, the control circuit 34 controls the inverse spreading code setting circuit 29 to output and perform the inverse spread modulation only on inverse spreading codes (vectors) corresponding to channels used in the FDM-CDMA method. That is, channels used in broadcasting in the FDM method are prevented from outputting inverse spreading codes.

Furthermore, the control circuit 34 controls the selecting/adding circuit 31 to select and add a desired channel from broadcasting adopting the FDM method and communication adopting the FDM-CDMA method. In this way, broadcasting in the FDM method and communication in the FDM-CDMA method according to the present invention can be used together.

Another characteristic of the present invention is that it allows the direct reception of digital broadcasting adopting the OFDM modulation method by using the FDM-CDMA receiving device of the present invention. The OFDM method is a kind of FDM method.

When digital broadcasts using the OFDM method are transmitted, the control circuit 16 of the transmitting device causes the up-converter of the transmitting portion 26 to perform the switching of the radio frequency bands, as in the above-described case. Further, the control circuit 15 controls the FDM combining circuit 25 to have a function of causing the digital filters 52-1 to 62-N to pass all of the frequency bands. That is, the control circuit 15 controls the FDM combining circuit 25 to prevent the digital filters 52-1 to 52-N from functioning as band pass filters. The control circuit 15 controls the spreading code setting circuit 23 to prevent channels used in the OFDM method from outputting the spreading codes.

Similarly, when digital broadcasts using the OFDM method are received, the control circuit 34 of the receiving device controls the FDM separating circuit 28 to cause the down-converter of the receiving portion 27 to perform switching of the radio frequency bands such that digital filters 84-1 to 84-N have the function to pass all of the frequency bands Further, the control circuit 34 controls the error correction circuit 33 to perform the error correction on data obtained in the demodulator circuit 32. The error correction circuit 33 operates only for the digital broadcasting using the OFDM method.

In this way, the various needs of users can be met by integrating broadcasting using the FDM method or the OFDM method and radio communication using the CDMA method.

It is intended that broadcasting adopting the FDM or OFDM method be performed quickly and in a stable manner through radio communication paths which have large transmission path distortion due to multiple propagation. It is intended that in communication adopting the CDMA method, small capacity data communication be performed in stable manner through unstable radio communication paths due to multiple propagation.

According to the present invention, when N pieces of digital data are assigned to N frequency channels in order to perform the modulation in the frequency division multiplex (FDM) method for transmission, N pieces digital data before the modulation are spreadingly modulated by the code division multiple access (CDMA) method. Thus, broadcasting adopting the FDM or OFDM method and communication adopting the CDMA method can be combined.

Transmission of digital broadcasts using the FDM (OFDM) method and data transmission in radio communication using the CDMA method can be performed by the same transmission device. As a result, the radio resources can be used in a flexible and effective manner, and the various needs of users can be met.

Further, N vectors are generated as spreading codes which are either +1 or −1 polarity and are unique to users, and nth (n is an integer from 1 to N) digital data and nth vector corresponding thereto are multiplied, so that spread modulation is performed on the N pieces of digital data.

The N frequency channels are divided into a plurality of groups and independent digital data is assigned to each of the groups. Thus, the channel capacity will be increased, and this results in an increase in the data transmission rate.

When N (N is an integer of 1 or above) pieces of digital data are assigned to N frequency channels and modulated and transmitted according to the frequency division multiplex (FDM) method, and when signals are received in which the spread modulation is performed, by the code division multiple access (CDMA) method, on N pieces of digital data before the modulation, the demodulation is performed on the received signals by the FDM method and the inverse spread modulation is performed, by the CDMA method, on N pieces of digital data after modulation. Thus, the inverse spread modulation is performed, by the CDMA method, on N pieces of digital data after the FDM demodulation, so that broadcasting using the FDM or OFDM method and communication in the CDMA method can be combined. In addition, the same receiving device can be used for the reception in digital broadcasting by the FDM method and the data reception in radio communication using the CDMA method.

N vectors are generated as inverse spreading codes, which are either +1 or −1 polarity and are unique to users at the transmission side and the nth (n is an integer from 1 to N) pieces of digital data before the demodulation and nth vector corresponding thereto are multiplied so that the inverse spread can be performed by a simple multiplication operation. Thus, the inverse spread modulation can be performed easily and instantly on the N pieces of digital data after demodulation. As a result, cell switching, which occurs frequently in mobile communication, can be performed smoothly.

Further, when a signal is received in which N frequency channels are divided into a plurality of groups and independent digital data is assigned to each of the groups, the digital data can be extracted for each group by selecting and adding frequency channels belonging to the same group, after the inverse spread modulation.

What is claimed is:

1. An FDM-CDMA transmission method comprising the steps of:
   assigning N (N is an interger of 1 or more) pieces of digital data to N frequency channels for modulation and transmission using the frequency division multiplex (FDM) method; and performing spread modulation on N pieces of digital data by the code division multiple access (CDMA) method before the modulation, wherein the spread modulation is performed only on the frequency channel adopting the FDM-CDMA method when FDM-method broadcasting and FDM-CDMA-method communication are used together for transmission.

2. An FDM-CDMA, transmission method as claimed in claim 1, further comprising the steps of:

generating N vectors, as spreading codes, which are +1 or −1 polarity and are unique to users; and multiplying the nth (n is an integer from 1 to N) digital data and the nth vector corresponding thereto, and wherein:

the spread modulation is performed on the N pieces of digital data by executing each of the steps.

3. An FDM-CDMA transmission method as claimed in claim 1, wherein: the N frequency channels are divided into a plurality of groups, and independent digital data is assigned to each of the groups.

4. An FDM-CDMA receiving method in which N (N is an integer of 1 or above) pieces of digital data are assigned to N frequency channels and are modulated and transmitted by the frequency division multiplex (FDM) method, the receiving method comprising the steps of: performing demodulation according to FDM method on the received signals, when signals are received in which spread modulation has been performed according to the code division multiple access (CDMA) method, on N pieces of digital data before the modulation; and performing inverse spread modulation according to the CDMA method on the N pieces of digital data after modulation;

performing the inverse spread modulation on the frequency channel adopting the FDM-CDMA method when FDM-method broadcasting and the FDM-CDMA-method communication are used together for receiving.

5. An FDM-CDMA receiving method as claimed in claim 4, further comprising the steps of:

generating N vectors, as inverse spreading codes, which are +1 or −1 polarity and which are unique to users at a transmission side; and multiplying the nth (n is an integer of 1 to N) digital data before the demodulation and the nth vector corresponding thereto, and wherein: the inverse spread modulation is performed on the N pieces of digital data after the demodulation by executing each of the steps.

6. An FDM-CDMA, receiving method as claimed in claim 4, further comprising the step of:

selecting and adding, for each group, only frequency channels belonging to the same group after the inverse spread modulation, when signals are received in which the N frequency channels are divided into a plurality of groups and independent digital data are assigned to each of the groups.

7. An FDM-CDMA transmitting device, comprising:

a frequency division multiplex (FDM) circuit for assigning N (N is an integer of 1 or above) pieces of digital data to N frequency channels for modulation according to the FDM method;

a spreading code setting circuit for generating N spreading codes unique to users; and a multiplier for multiplying the nth (n is an integer from 1 to N) before the modulation and the nth spreading code corresponding thereto for outputting the digital data after the multiplication to an FDM combining circuit, wherein the spreading code setting circuit only generates the spreading codes corresponding to the frequency channels used in the FDM-CDMA method when FDM-method broadcasting and the FDM-CDMA-method communication are used together for transmission.

8. An FDM-CDMA transmitting device as claimed in claim 7, wherein: the spreading code setting circuit generates N vectors, as spreading codes, which are either +1 or −1 polarity.

9. An FDM-CDMA transmitting device as claimed in claim 7, further comprising:

a signal dividing circuit for dividing the N frequency channels into a plurality of groups and for assigning independent digital data to each of the groups.

10. An FDM-CDMA receiving device, in which N (N is an integer of 1 or above) pieces of digital data are assigned to N frequency channels and are modulated and transmitted according to the frequency channels and are modulated and transmitted according to the frequency division mutiplex (FDM) method, the receiving device comprising:

a frequency division multiplex (FDM) separating circuit for receiving signals on which spread modulation according to the code division multiple access (CDMA) method has been performed on N pieces of digital data before the modulation, then performing demodulation according to the FDM method on the received signals, and outputting N pieces of digital data after the demodulation;

an inverse spreading code setting circuit for generating N inverse spreading codes inherent to users at a transmission side; and a multiplier for multiplying the nth (n is an integer from 1 to N) digital data after the demodulation and the nth inverse spreading code corresponding thereto, wherein:

the inverse spreading code setting circuit only generates the inverse spreading codes corresponding to the frequency channels used in the FDM-CDMA-method when FDM-method broadcasting and FDM-CDMA-method communication are used together for reception.

11. An FDM-CDMA receiving device as claimed in claim 10, wherein:

the inverse spreading code setting circuit generates N vectors, as inverse spreading codes, which are +1 or −1 polarity and are unique to users at the transmission side.

12. An FDM-CDMA receiving device as claimed in claim 10, further comprising:

a selecting/adding circuit for selecting and adding, for each group, only frequency channels belonging to the same group after the inverse spread modulation, when signals are received in which the N frequency channels are divided into a plurality of groups and independent digital data is assigned to each of the groups.

* * * * *